May 1, 1956     H. N. HAYWARD ET AL     2,743,616
DRIVE MECHANISM FOR SCANNING DEVICES
Filed Nov. 7, 1950     7 Sheets-Sheet 1

INVENTORS
HAROLD N. HAYWARD
HERMAN M. DIENER

BY
ATTORNEYS

INVENTORS
HAROLD N. HAYWARD
HERMAN M. DIENER

BY
ATTORNEYS

May 1, 1956  H. N. HAYWARD ET AL  2,743,616
DRIVE MECHANISM FOR SCANNING DEVICES
Filed Nov. 7, 1950  7 Sheets-Sheet 4

INVENTORS
HAROLD N. HAYWARD
HERMAN M. DIENER

BY
ATTORNEYS

May 1, 1956  H. N. HAYWARD ET AL  2,743,616
DRIVE MECHANISM FOR SCANNING DEVICES
Filed Nov. 7, 1950  7 Sheets-Sheet 5

INVENTORS
HAROLD N. HAYWARD
HERMAN M. DIENER
BY
George Sipkin
ATTORNEYS

May 1, 1956 H. N. HAYWARD ET AL 2,743,616
DRIVE MECHANISM FOR SCANNING DEVICES
Filed Nov. 7, 1950 7 Sheets-Sheet 6

INVENTORS
HAROLD N. HAYWARD
HERMAN M. DIENER
BY
ATTORNEYS

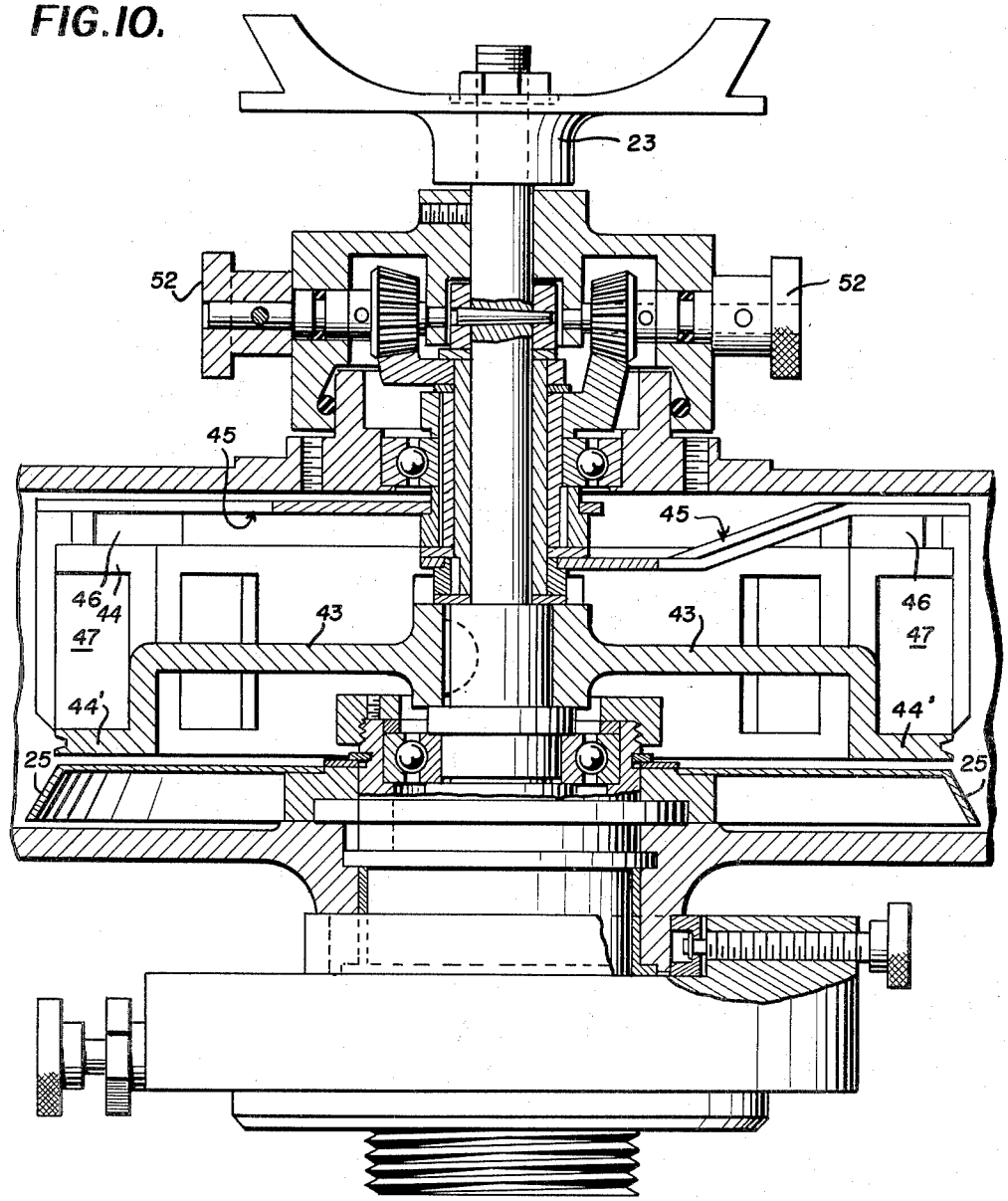

United States Patent Office 2,743,616
Patented May 1, 1956

2,743,616

DRIVE MECHANISM FOR SCANNING DEVICES

Harold N. Hayward, Urbana, Ill., and Herman M. Diener, Washington, D. C.

Application November 7, 1950, Serial No. 194,544

2 Claims. (Cl. 74—31)

(Granted under Title 35, U. S. Code (1952), sec. 266)

The invention described herein may be manufactured and used by or for the Government of the United States for governmental purposes without the payment of any royalties thereon or therefor.

The present invention relates to a drive mechanism for scanning devices and more particularly to a drive mechanism which permits the scanning device to function through any selected angle of scan.

Present scanning devices possess a number of disadvantages or weaknesses, among which is the lack of flexibility in selecting the area to be covered by the scan. These prior known devices either rotate continuously and thus scan through 360° without any limitation, or else if they should have a limited angle of scan then this is generally obtained through the use of cumbersome gear trains, or complex electrical switch and reversible motor systems.

The instant invention, however, offers many advantages and improvements in that the scanning area may be easily and instantly changed to any desired amount within the approximate limits of 30° and 120°. Furthermore, the changes and adjustments may be accurately made for amounts as small as 1° or less while manual controls are furnished for precisely positioning the scanner on a single particular bearing, should such be desired. The drive mechanism of the invention has also the advantage of being simple in operation and without cumbersome gear trains, of operating on low power and at constant speed, and of operating by means of a small non-reversible continuously running motor. The device is particularly adaptable for use in light-weight portable scanning devices, but is not limited solely thereto.

With the above features in mind, the primary object of the invention is the provision of a drive mechanism for scanning devices wherein the angle of scan may be instantly and easily made for any desired value over a wide range.

Another object is the provision of a drive mechanism which operates on low power and at constant speed.

Still another object is the provision of a drive mechanism which develops an oscillatory motion, but does not utilize a reversible motor.

Yet another object is the provision of a drive mechanism which is inexpensive to construct and which does not contain complex gear trains or switching arrangements.

With these and other objects in view, as will hereinafter more fully appear, and which will be more particularly pointed out in the appended claims, reference is now made to the following description taken in connection with the accompanying drawings in which:

Fig. 10 is a view taken along the line 10—10 of Fig. 2.

Figure 1:
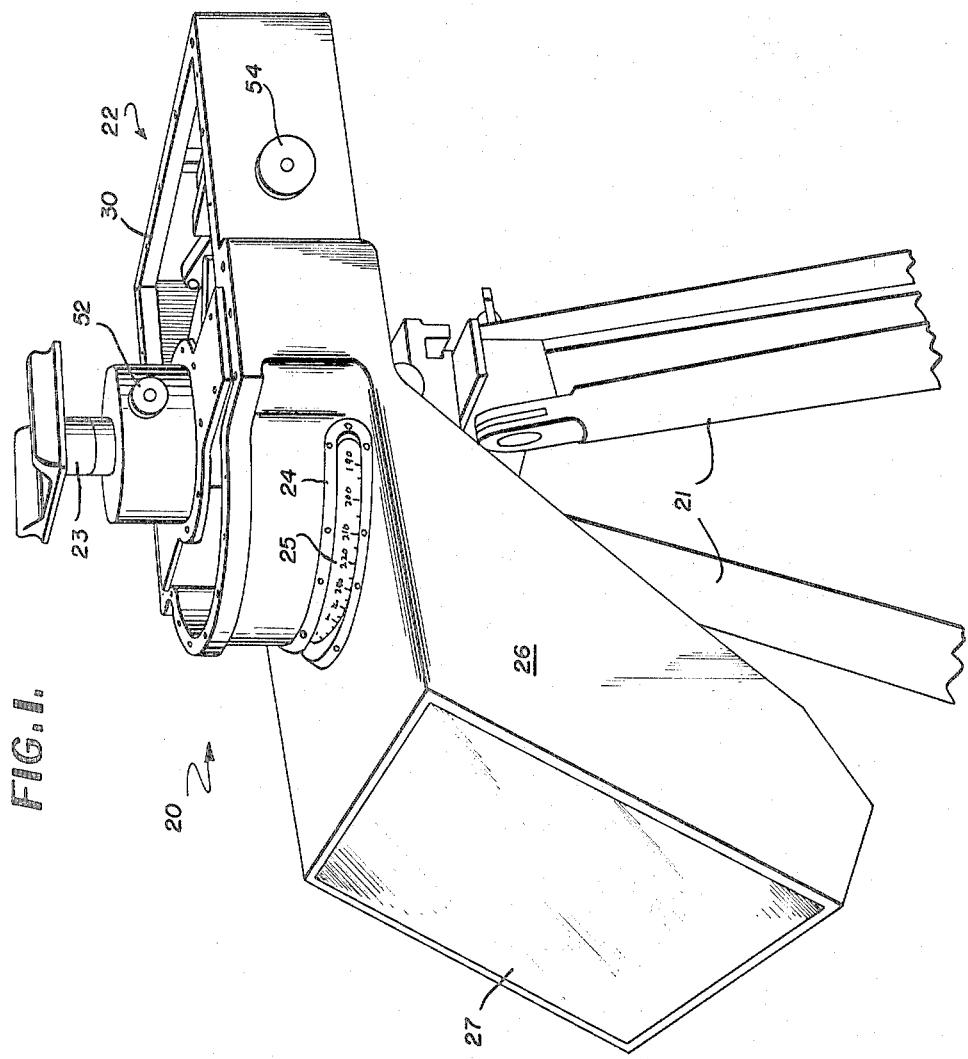
Fig. 1 shows a typical light weight, portable, scanning device and recorder such as might use the drive mechanism of the present invention.

Referring now to the drawings, wherein like reference characters designate like or corresponding parts throughout the several views, there is shown in Fig. 1, and indicated generally as 20, a typical light weight portable scanning device and recorder such as might employ the drive mechanism of the present invention. It is to be understood, however, that the embodiment shown herein is not to be taken as the only type of equipment on which the invention may be installed.

Returning now to Fig. 1, there is shown a tripod 21 for supporting the device 20, the rearmost section 22 of which is used to house the drive mechanism. Rotating under the influence of the drive mechanism, and located at the top of device 20, is a shaft and bracket 23 upon which any familiar design of receiving antenna may be mounted. It is to be noted that in each of the figures herein presented, that there is not shown an antenna on bracket 23, the reasons being for simplicity and for the fact that the drive mechanism will operate effectively for all types of antennas.

Conveniently situated so as to be clearly visible from the front of the scanning device 20, is an arcuate window 24 through which may be viewed an azimuth scale 25. By means of scale 25, it is possible to instantly determine the number of degrees through which the device is scanning, and by proper orientation of the device before the scanning operation is begun, the scale may be utilized to read either relative or true bearings. The box-like portion 26 of the equipment may be used to house a recorder of any well known design; readings being observed through a window 27.

Figs. 2 to 10 inclusive, which illustrate in varying degrees of detail the drive mechanism forming the basis of the present invention, will now be referred to and described at length. Attached to the framework 30, forming the rearmost portion 22 of device 20, is a bracket 31 having spacers 32 by means of which there is supported a motor plate 33. Fastened to plate 33 by means of screws 34 is a low power, continuous running, non-reversible, synchronous motor 35, or the like, while inserted between the plate 33 and bracket 31 there is a pin 36 which serves as a pivotal support for a toggle assembly 37. The construction and operation of the toggle assembly will be more fully described hereinafter.

Figure 4:
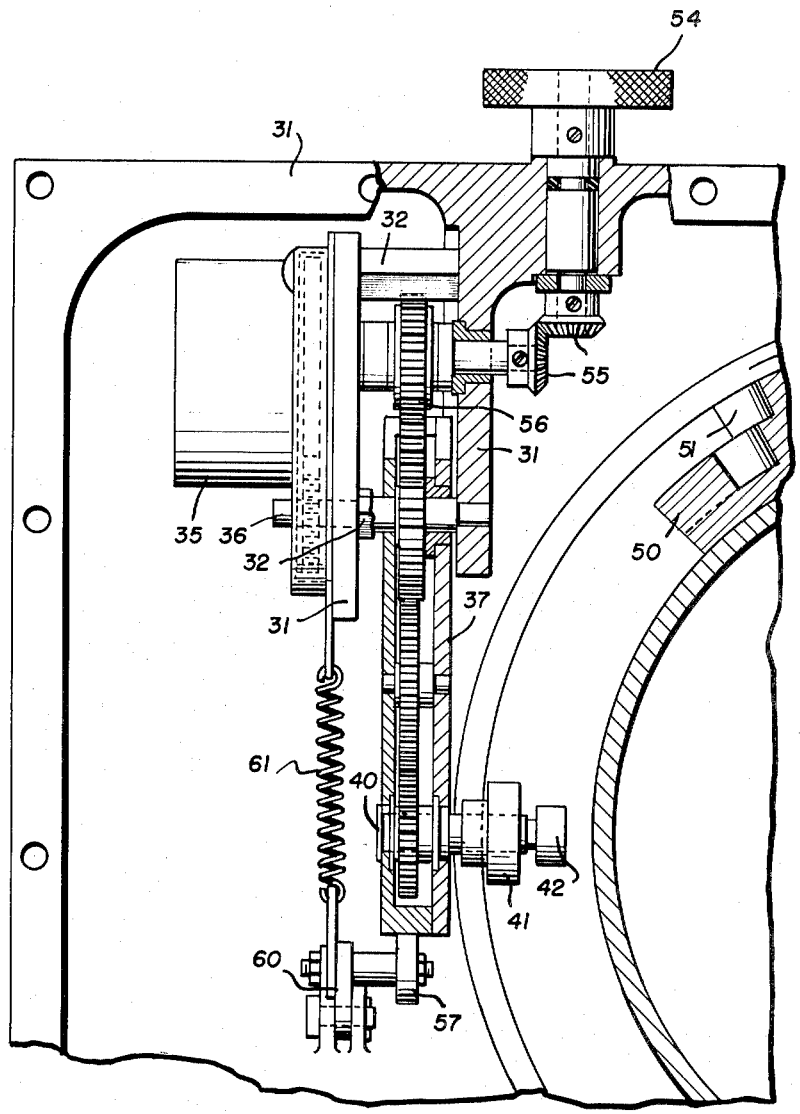
Fig. 4 is a detailed view of the motor and gear train.
Figure 5:
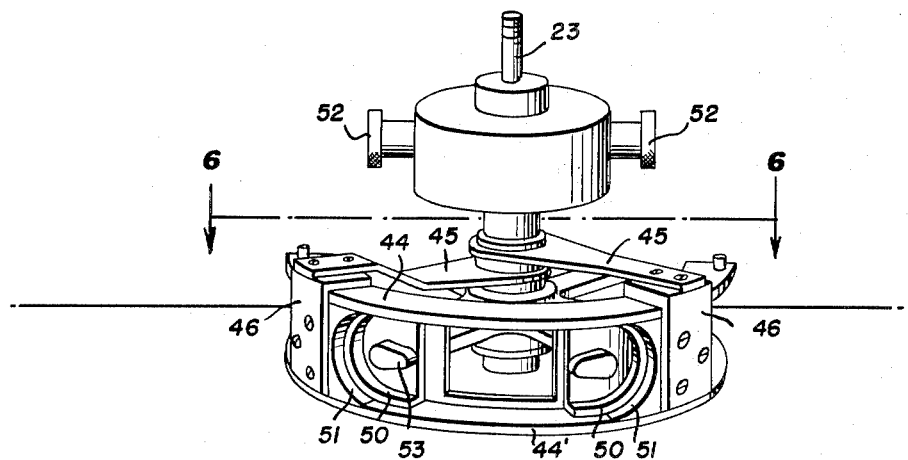
Fig. 5 shows the adjustable track for guiding the frictional drive member.
Figure 6:
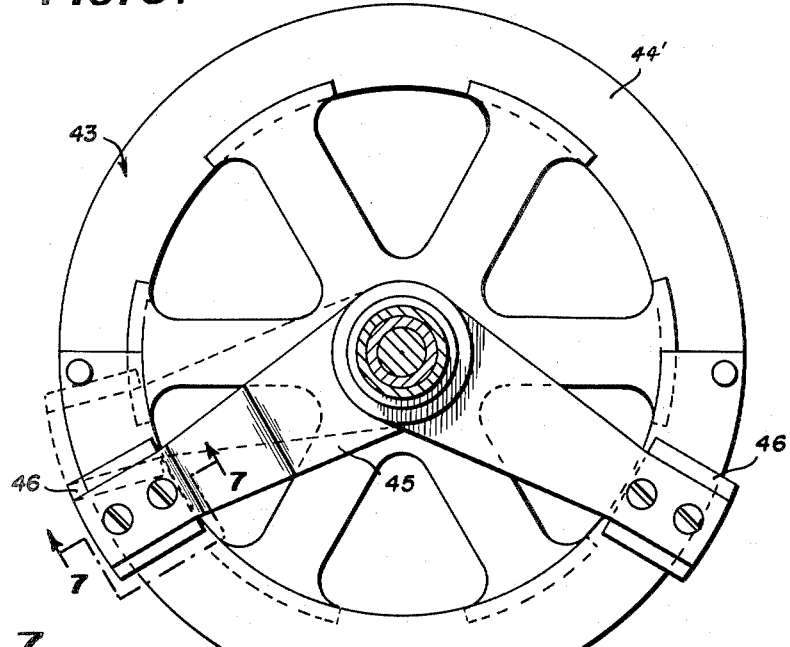
Fig. 6 is a view taken along the line 6—6 of Fig. 5 and looking in the direction of the arrows.
Figure 7:
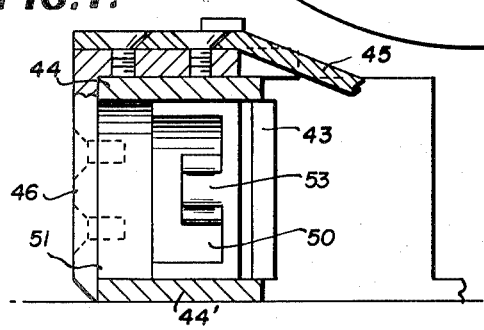
Fig. 7 is a view taken along the line 7—7 of Fig. 6.
Figure 8:
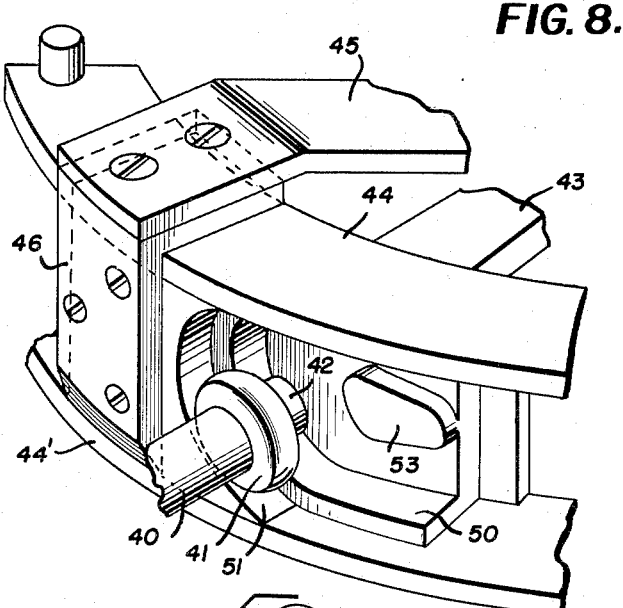
Fig. 8 is an enlarged fragmentary perspective view showing one end of the track and the frictional drive member positioned therein.
Figure 9:
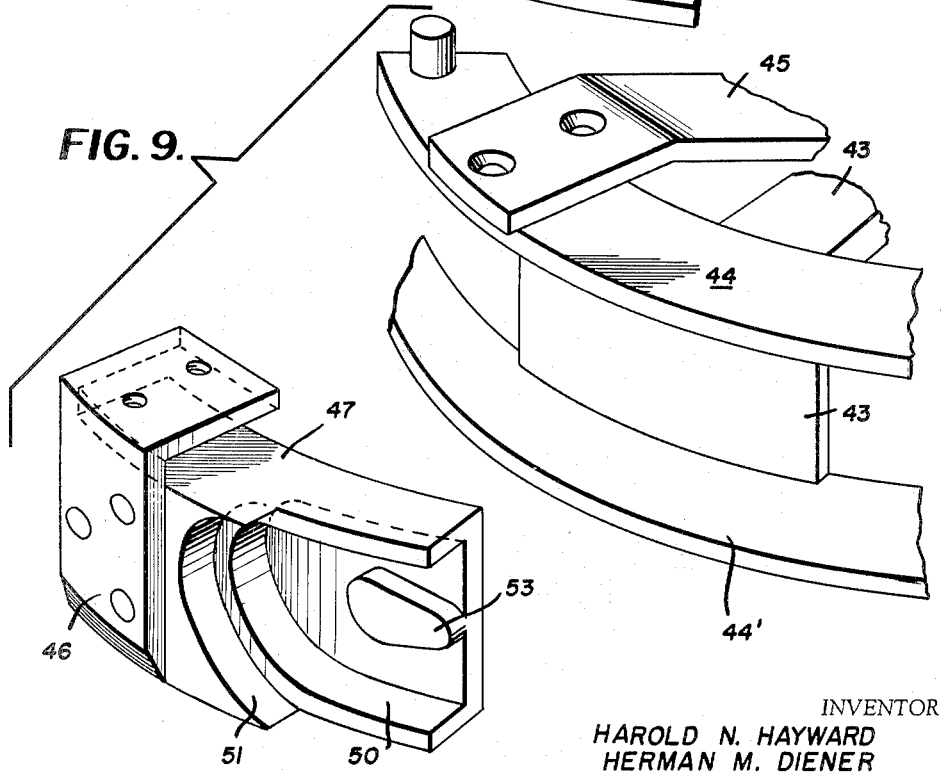
Fig. 9 shows one of the track ends dismantled.

At the end of the toggle assembly 37, remote from motor 35, there is mounted transversely of the assembly 37, a rotatable shaft 40 which has near its end a frictional drive member 41 and at its extreme end a small ball bearing wheel 42 (clearly seen in Figs. 4 and 8). By means of a gear train, or the like, within the assembly 37, which will be more fully described hereinafter, the frictional drive member 41 is caused to rotate by motor 35.

Centrally located within the scanning device and mounted so that its axis of rotation is in a vertical plane and connected to antenna bracket 23, is a wheel 43 of relatively large diameter and relatively large width along the peripheral portion of the rim. Wheel 43 is so constructed that for a portion of its periphery, it has two straight-sided flanges 44 and 44' extending beyond the rim to thereby form with the rim, a square-sided track along the periphery of the wheel. However, it is to be noted, by referring to Fig. 6, that while the lower flange 44' extends completely around wheel 43, the upper flange 44 is broken off so that in effect it is only an arcuate segment encompassing approximately an 180° arc. The span of this arcuate segment is the controlling factor in determining the maximum angle through which the scanner will operate, and while the embodiment illustrated will function up to about 120° it is to be understood that it is taken as an example only and that the invention will operate equally well when other arcs are used.

Figure 2:
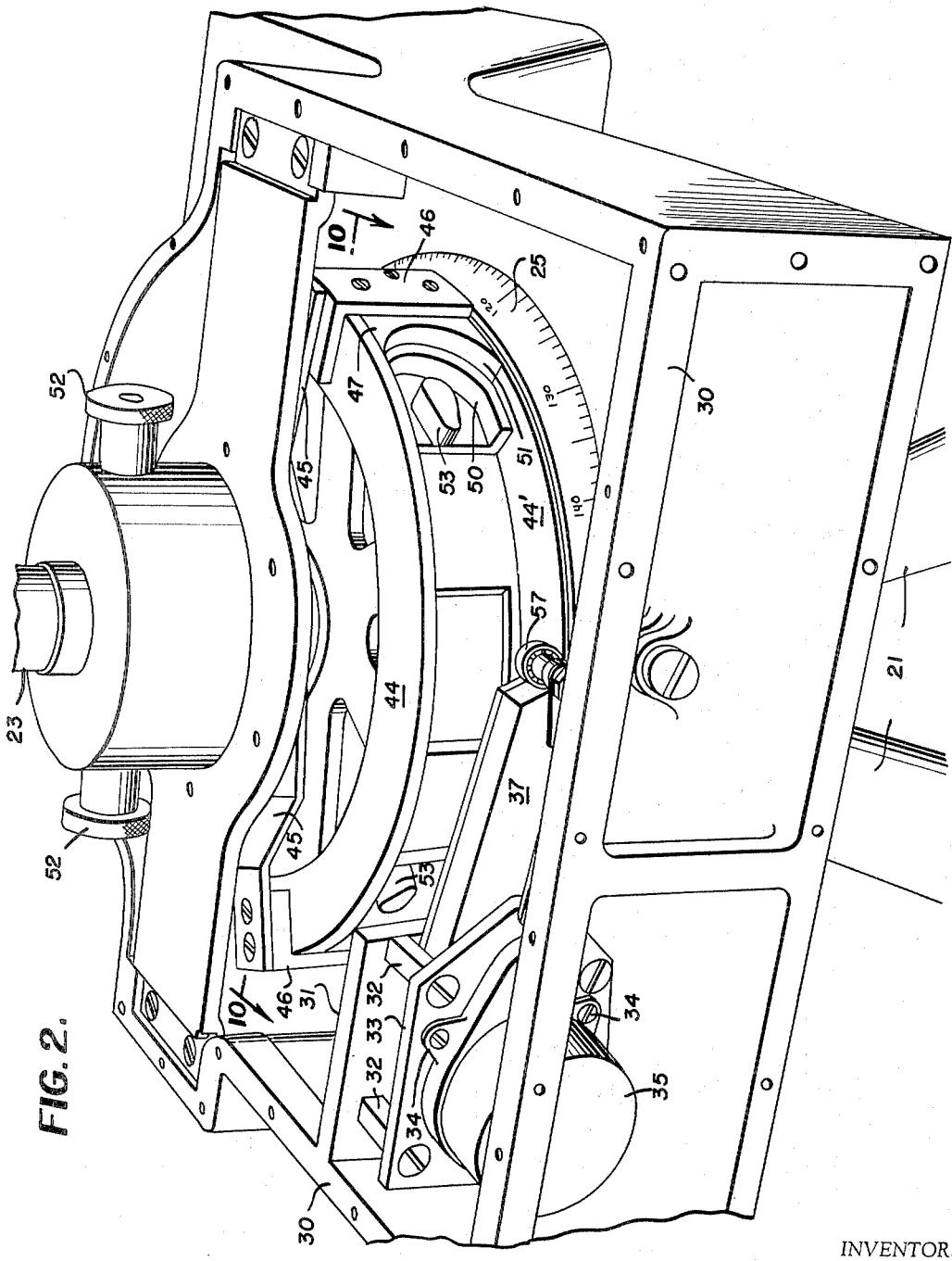
Fig. 2 shows an enlarged perspective view of the drive mechanism with the adjustment set for maximum angle of scan.
Figure 3:
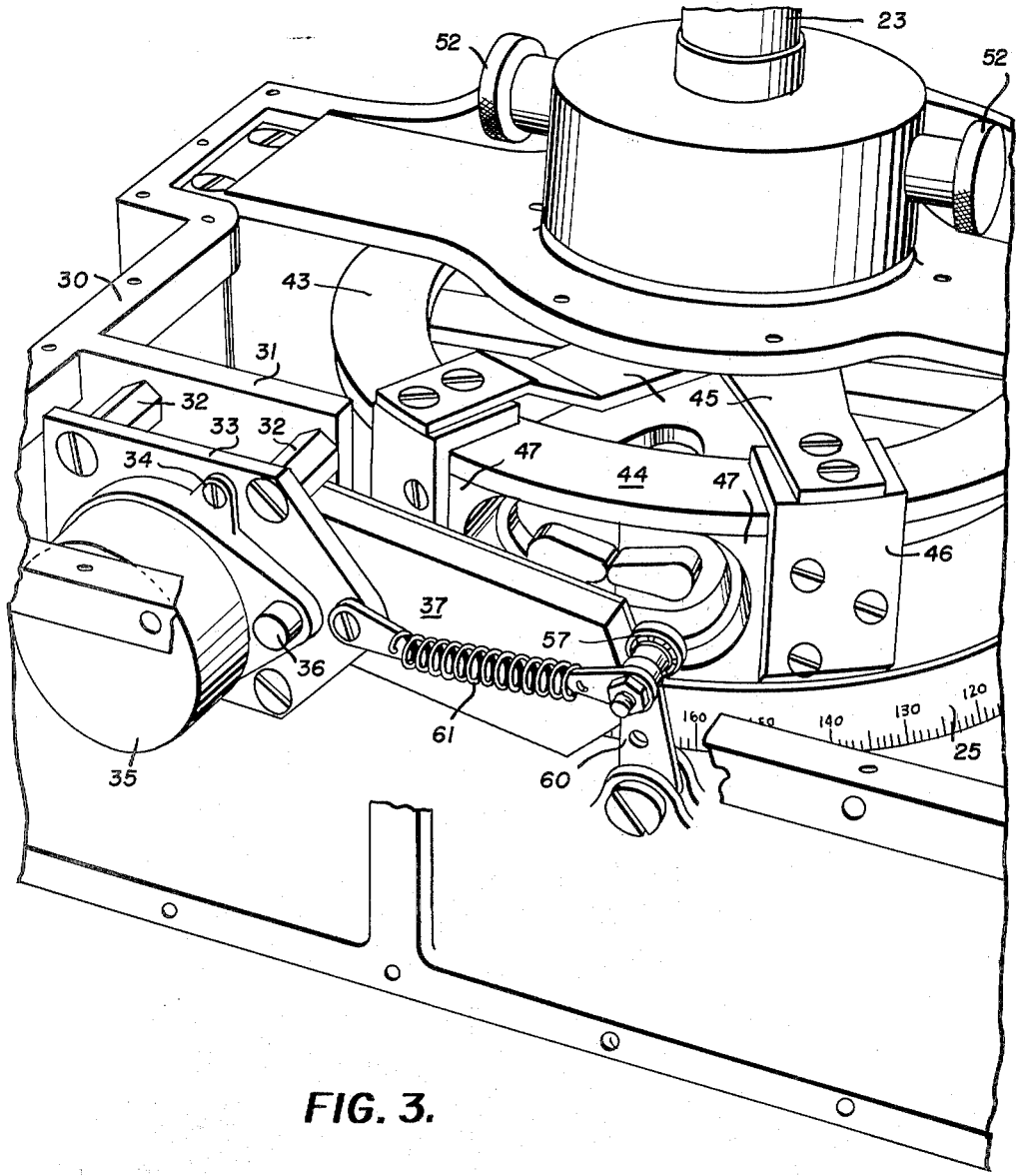
Fig. 3 is an enlarged perspective view of the drive mechanism with the adjustment set for a minimum angle of scan.

Also mounted so as to rotate about the same axis as wheel 43 are two arms 45, each having at its outer extremity an L-shaped plate 46 which slides along the top flange segment 44 on one of its sides and which extends over the track formed by flanges 44 and 44' along its other side (Figs. 2, 3, 5, 6, 8 and 9). Screwed to that side of the plate 46 which extends over the track is a block 47 which exactly fits into the track and which is slidable therein on flange 44'; the block having cut therein a pair of U-shaped tracks 50 and 51 (Figs. 2, 3, 5, 8 and 9) with track 51 of somewhat greater diameter than track 50 and being tapered down to smoothly meet the lower flange 44'. Thus it is clear from the above description and from the drawings, that in effect the blocks 47 and therefore the U-shaped tracks 50 and 51 act as adjustable ends for the elliptical-shaped track formed by flange 44', flange segment 44 and the rim of wheel 43, and that the length of the track may be altered by adjustment of these blocks. The knurled knobs 52, which are positioned above the entire drive mechanism, are used to adjust, by means of suitable bevel gears and concentric cylinders (Fig. 10), the arms 45 and therefore the ends of the track. The function of the guide-posts 53, placed within track 50, will be described later. Fig. 2 shows the position of the track ends when set for maximum angle of scan, while Fig. 3 shows their position for minimum scan.

Returning now to the description of the toggle assembly 37 (Figs. 2, 3 and 4), it can be seen that it is essentially rectangular in shape and has the end nearest the friction drive member 41 slightly pointed. Within the confines of the assembly is a simple gear train (Fig. 4) which is used to deliver power from the motor 35 to the frictional drive member 41. Accessible from the outside of framework 30 and extending therethrough is a knurled knob and shaft 54 which acts to rotate bevel gears 55 and thereby rotate auxiliary gear 56. Gear 56 is mounted on bracket 31 and joins the gear train within the assembly 37 without passing through the motor 35 whereby the friction member 41 may be moved manually, by rotating knob 54, should it be desirous to accurately position the receiving antenna on any fixed bearing.

In order to maintain sufficient frictional contact between drive member 41 and the track so that wheel 43 and its associated parts will be caused to rotate, there is provided a small ball-bearing wheel 57 which is in contact with the sloping end of the toggle assembly 37, wheel 57 being mounted on a pivoted arm 60 and held in contact with the toggle 37 by means of a spring 61. Therefore, when wheel 57 is in the position shown in Figs. 2 and 3 frictional contact is being maintained between driving member 41 and the lower flange 44', while wheel 57 will contact the opposite slope when driving member 41 contacts the upper flange segment 44.

Scale 25, which is graduated in degrees of bearing, has approximately the same diameter as wheel 43 and is mounted just below wheel 43 so that it rotates therewith.

In operation, if the drive mechanism is being used in a scanning unit similar to that shown in Fig. 1, for example, the entire device 20 is first turned around on tripod 21 until scale 25 is properly oriented with true bearing readings. Then knobs 52 are turned to set the drive mechanism so that it will oscillate the receiving antenna (not shown) which is mounted on bracket 23, throughout a selected number of degrees thereby determining the angle of scan. Knobs 52 and their associated bevel gears (Fig. 10) move arms 45 about their axis of rotation thereby causing the end blocks 47 to slide along the track formed by flange 44' and flange segment 44 so as to adjust the long axis of this elliptical track according to the desired angle to be scanned.

When potential is applied to motor 35, power is transferred through the gear train of toggle assembly 37 to rotate friction drive member 41, which it will be remembered is positioned always to be in contact with the track. Thus the path of travel of drive member 41 is around a closed path consisting of the top side of the lower flange 44', around one end block by means of U-shaped track 51, along the bottom side of the flange segment 44, and finally around the other end block by means of the other U-shaped track 51. Looking at the views of Figs. 2 and 3, it follows, therefore, that should the drive member be rotating in a clockwise direction that wheel 43 (and therefore the receiving antenna) will turn to the left, but when member 41 contacts the upper side of the track (or flange segment 44), wheel 43 will turn to the right, and the resulting oscillation of wheel 43 is obtained from a drive which always rotates in the same direction. The further apart the end tracks 51 are placed the wider will be the angle of scan, and in the embodiment illustrated herein these limits will be between approximately 30° (Fig. 3) and 120° (Fig. 2), but it is to be understood that the device will operate equally well for wider angles.

The small wheel 42, which is located on the same shaft (40) beside drive 41, is positioned to cooperate with U-shaped track 50 and guidepost 53 to give a more positive reversal of direction to wheel 43, and also to aid drive member 41 in overcoming the tension of spring 61 so that wheel 57 will move to the opposite slope on the end of toggle assembly 37.

From the above description and operation, it is obvious that the present invention offers many improvements in scanner drive mechanisms in that the angle of scan may be readily and simply adjusted for any value within a wide range, that the scanning operation is performed by means of a low power non-reversible motor without the necessity of complex reversing gears or switching mechanisms, and that the device is simple and inexpensive to construct.

It should be understood, of course, that the foregoing disclosure relates to only a preferred embodiment of the invention and that it is intended to cover all changes and modifications of the example of the invention herein chosen for the purposes of disclosure, which do not constitute departures from the spirit and scope of the invention as set forth in the appended claims.

What is claimed is:

1. A drive mechanism for rotary scanning devices comprising a rotatable wheel-like mounting for a scanning device, an elliptical track attached to said mounting with the short axis in a vertical plane and the long axis along the rim of the wheel, said track including rounded end blocks each of which is adjustable in the direction of said long axis, a motor adapted to rotate continuously in one direction, a toggle-like assembly comprising a lever having one end rotatably connected to the housing of the motor and having a friction driving means rotatably mounted at the other end thereof; gear means carried by said lever and connecting the motor and the friction driving means, said friction driving means rotatably engaging the elliptical track to impart motion to said mounting in one direction when engaging the lower side of the elliptical track, and in the opposite direction when engaging the upper portion of the track, said toggle assembly further comprising a spring actuated means adapted to bias said lever in one or the other of opposite directions about its axis of rotation, thereby maintaining the friction driving means successively in contact with the lower and upper track portions.

2. A drive mechanism for rotary scanning devices, as set forth in claim 1, said mechanism further comprising manually operable control means for individually adjusting the end blocks relative to the long axis of the ellipse and the rim of the wheel; the distance between said blocks serving to determine the magnitude of the scanning arc, the position thereof relative to the rim serving to determine the field of action of said scanning arc.

References Cited in the file of this patent

UNITED STATES PATENTS

| | | |
|---|---|---|
| 1,021,536 | Laskey | Mar. 26, 1912 |
| 1,858,624 | Hess | May 17, 1932 |
| 2,441,596 | Reitter | May 18, 1948 |
| 2,447,818 | Rieber | Aug. 14, 1948 |
| 2,477,343 | Merwin | July 26, 1949 |

FOREIGN PATENTS

| | | |
|---|---|---|
| 345,107 | Germany | Dec. 5, 1921 |
| 430,856 | Great Britain | June 26, 1935 |